(No Model.)
W. F. HENRY.
WHIFFLETREE ATTACHMENT FOR VEHICLES.
No. 460,823. Patented Oct. 6, 1891.
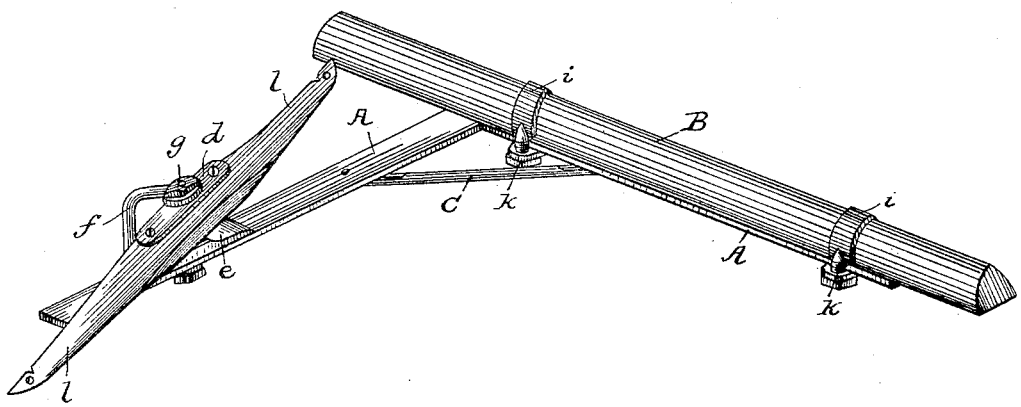
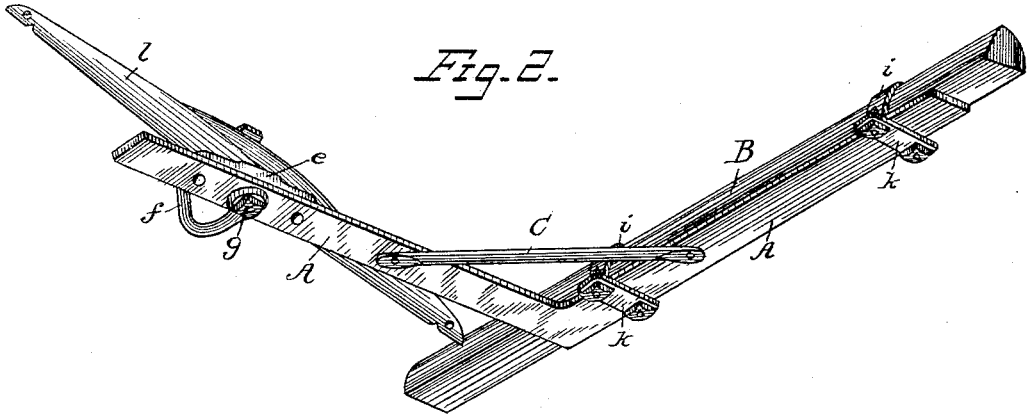
Witnesses
Albert Popkins
G. M. Copenhaver
Inventor
William F. Henry
By his Attorney
Attorney

United States Patent Office.

WILLIAM F. HENRY, OF NORMAL, ILLINOIS.

WHIFFLETREE ATTACHMENT FOR VEHICLES.

SPECIFICATION forming part of Letters Patent No. 460,823, dated October 6, 1891.

Application filed February 10, 1891. Serial No. 380,964. (No model.)

*To all whom it may concern:*

Be it known that I, WILLIAM F. HENRY, of Normal, in the county of McLean and State of Illinois, have invented certain new and useful Improvements in Whiffletree Attachments; and I do hereby declare the following to be a full, clear, and exact description of the invention, such as will enable others skilled in the art to which it appertains to make and use the same.

My invention is an improved whiffletree attachment for vehicle-shafts; and it consists in certain novel features hereinafter described and claimed.

The object of my invention is to provide an improved device which can be attached to shafts of vehicles for conveniently breaking or training colts or young horses by causing them to travel by the side of a well-known animal. This object I accomplish by the use of the mechanism illustrated in the annexed drawings, in which—

Figure 1 is a perspective view of my improved device looking at the upper side of the same, and Fig. 2 is a similar view looking at the under side thereof.

Referring to the drawings by letter, B designates the shaft, to the under side of which I secure the L-shaped bracket A by means of clips $i\ k$, as shown. Although I have shown these clips and prefer to use them, the bracket may be secured to the shaft in any other desired manner, as will be readily understood. One arm of the bracket extends along the under side of the shaft, while the other arm projects outward from the same, the two arms being connected by a brace C, as shown, so as to give a certain rigidity to the free arm, and thereby lend the requisite strength to the same.

$l$ designates the whiffletree. It is pivotally mounted on a bolt or pivot pin $g$, secured in the ends of a clevis $f$ and passing through the free arm of the bracket. The whiffletree is re-enforced against wear at its center by the metal plates or bars $d\ e$, the bar $d$ being secured on the upper side of the whiffletree, and the bar $e$ being secured upon the upper side of the free arm of the bracket A.

In practice a well-trained animal is harnessed in the shafts, and the colt or young horse to be broken is then harnessed to the whiffletree $l$, after which the team is driven over the road or track in the usual manner.

It will be observed that in the use of my device the colt is driven outside of the shafts so that he is left somewhat free, and consequently he is gradually and therefore more effectually restrained, besides being relieved of all weight and draft. Furthermore, by being made to travel alongside of a trained animal the colt soon learns to obey the reins and loses any awkwardness or imperfections in his step.

My device is extremely simple in its construction, and its advantages are thought to be obvious.

Having thus described my invention, what I claim, and desire to secure by Letters Patent, is—

1. The combination, with the shafts of a vehicle, of the bracket secured thereto and the whiffletree mounted on said bracket, as set forth.

2. The combination, with the shaft, of the L-shaped bracket secured thereto and having an arm projecting outward therefrom and the whiffletree pivotally mounted upon the said outwardly-projecting arm of the bracket, substantially as described.

3. An attachment for vehicle-shafts, consisting of an L-shaped bracket secured to the under side of the shaft and having a free arm projecting outward from the shaft, a brace connecting the arms of the bracket, and a whiffletree mounted on the free arm of the same, as specified.

In testimony whereof I have signed this specification in the presence of two subscribing witnesses.

WILLIAM F. HENRY.

Witnesses:
    WILLIAM P. BOLLES,
    SAM WELTY.